United States Patent
Chang et al.

(10) Patent No.: US 8,572,006 B2
(45) Date of Patent: Oct. 29, 2013

(54) METHOD FOR MULTI-LAYER CLASSIFIER

(75) Inventors: King Jen Chang, Taipei (TW); Wen Hwa Chen, Taipei (TW); Argon Chen, Zhonghe (TW); Chiung Nein Chen, Jiali Township, Tainan County (TW); Ming Chih Ho, Taipei (TW); Hao Chih Tai, Taipei (TW); Ming Hsun Wu, Taipei (TW); Hsin-Jung Wu, Taiping (TW)

(73) Assignee: AmCad BioMed Corporation, Taipei (TW)

( * ) Notice: Subject to any disclaimer, the term of this patent is extended or adjusted under 35 U.S.C. 154(b) by 949 days.

(21) Appl. No.: 12/693,147

(22) Filed: Jan. 25, 2010

(65) Prior Publication Data

US 2011/0182522 A1    Jul. 28, 2011

(51) Int. Cl.
   *G06F 15/18*    (2006.01)
   *G06K 9/62*    (2006.01)
(52) U.S. Cl.
   CPC .............. *G06F 15/18* (2013.01); *G06K 9/6282* (2013.01)
   USPC .......................................................... 706/12
(58) Field of Classification Search
   CPC ....................................................... G06K 9/62
   See application file for complete search history.

(56) References Cited

U.S. PATENT DOCUMENTS

2003/0061213 A1* 3/2003 Yu et al. ............................. 707/7
2007/0288417 A1* 12/2007 Aggarwal et al. ................ 706/52
2009/0281981 A1* 11/2009 Chen et al. ........................ 706/56

OTHER PUBLICATIONS

Loh, Wei-Yin et al.; "Split Selection Methods for Classification Trees"; 1997; Statistica Sinica 7(1997); pp. 815-840.*
Rokach, Lior et al.; "Top-Down Induction of Decision Trees Classifiers—A Survey"; 2005; IEEE; Transactions on Systems, Man, and Cybernetics—Part C: Applications and Reviews, vol. 35, No. 4; pp. 476-487.*
Rokach, Lior et al.; "Decision Trees"; 2005; Data Mining and Knowledge Discovery Handbook; pp. 165-192.*

* cited by examiner

*Primary Examiner* — Lut Wong
*Assistant Examiner* — Stanley K Hill
(74) *Attorney, Agent, or Firm* — Muncy, Geissler, Olds & Lowe, PLLC

(57) ABSTRACT

The present invention relates to a method for multi-layer classifier applying on a computer readable medium for classifying multiple image samples. The method at least comprising the following steps: (a) receiving a plurality of samples; (b) providing a plurality of attributes, and evaluating a significance of the attributes by a selection criterion; (c) selecting at least one cut-point to establish a discriminant analysis model; (d) proceeding a step of evaluating a performance of the discriminant analysis model by adding the attributes to the discriminant analysis model; and (e) providing a stop criterion. The present invention also provides a computer readable medium for classifying multiple image samples by using the method for multi-layer classifier.

20 Claims, 18 Drawing Sheets

METHOD FOR MULTI-LAYER CLASSIFIER

BACKGROUND OF THE INVENTION

1. Field of the Invention

The present invention relates to a method for multi-layer classifier and, more particularly, to a method for classifier, which can be used to built a multi-layer discriminant analysis model, and determine attributes and cut-points.

2. Description of Related Art

Classification methods are widely applied in various fields. For example, in the financial industry, the classification method can be used for predicting the probability of exerting irrecoverable loans when examining on an applicant for credit cards. In the medical practice, the classification method can be used for determining whether the tissue is normal or not. Furthermore, in the marketing research, the classification method can determine whether the marketing strategy can attract consumers' attention and increase consumption of goods or not. Hence, the classification methods play an important role in the research on data mining.

Among all of the classification methods, proper attributes must be selected to build a classification model. During the process of classification model building, the data are classified into two groups, wherein one group consists of training samples, and the other group consists of independent test samples. In addition, the training samples are used to build a classification model, and the independent test samples are used to verify the robustness of the classification model.

Currently, there are two kinds of common classification methods. One method is Fisher linear discriminant analysis (FLD), and the other one is classification and regression trees (CART). However, since parts of attributes can only be used to determine specific classes, the accuracy of the aforementioned classification method is decreased. The accuracy is probably decreased because of different combination of attributes selection, and lacks of evaluating a performance of the discriminant analysis model.

Hence, it is desirable to provide a novel method for multi-layer classifier to solve the aforementioned problems.

SUMMARY OF THE INVENTION

The object of the present invention is to provide a method for multi-layer classifier, which classifies the samples into 1 or 2 classes in each layer by selecting one or two cut-points. Furthermore, a linear combination of multiple attributes by the Fisher linear discriminant analysis can be used at each layer.

To achieve the object, the present invention provides a method for multi-layer classifier, applying on a computer readable medium for classifying multiple image samples including a processor, an input device, and a storage device, the method at least comprising the following steps:

(a) receiving a plurality of samples;

(b) providing a plurality of attributes, and evaluating a significance of the samples to the attributes by a selection criterion;

(c) selecting at least one cut-point to establish a discriminant analysis model, which is established by providing a criterion to determine the at least one cut-point in one of the samples which is significant according to the step (b), and classifying the samples into at least one class, wherein the at least one class comprises a first class (Node$_A$), a second class (Node$_B$), and an undefined third class (Node$_N$);

(d) proceeding a step of evaluating a performance of the discriminant analysis model when adding the attributes into the discriminant analysis model, wherein the discriminant analysis model further classifies the undefined class (Node$_N$) and the sample thereof into a next layer when the performance of the discriminant analysis model is improved by adding the attributes, and the next layer of the discriminant analysis model is established by providing the criterion to determine the at least one cut-point of the samples which is significant according to the added attributes, and then classifying the samples into the first class (Node$_A$), second class (Node$_B$), and undefined third class (Node$_N$); and (e) providing a stop criterion, in which the discriminant analysis model stops classfying into the next layer when there is no significant attributes can be found at next layer; or in which the discriminant analysis model stops classifying into the next layer when proceeding the step of evaluating the performance of the discriminant analysis model cannot be improved by adding the attributes to the discriminant analysis model under a condition of a rejected null hypothesis.

The present invention also provides a computer readable medium for classifying multiple image samples, which storing a program to classify the multiple image samples by performing the method for multi-layer classifier therein, the computer readable medium including a processor, an input device, and a storage device.

The method for multi-layer classifier of the present invention, wherein the number of the samples of the undefined third class (Node$_N$) is zero in the last layer of the discriminant analysis model when adding the stop criterion. That is, the final result of the multi-layer classifier, all of the samples must be classified into the first class (Node$_A$) and/or the second class (Node$_B$).

The method for multi-layer classifier of the present invention, the attribute selection criterion preferably is, Wilk's lambda or Gini index, but not limited thereto. The attributes preferably are, ringPDVImax, VeinCentralVImin, VeinTD-CentralVImax, TDVImax, CI, RMV, CI2, MCI3, or MI2, but not limited thereto. The criterion to determine at least one cut-point preferably is, Gini index, Mahalanobis distance, or Youden's Index, but not limited thereto. The regression analysis preferably comprises, but not limited to, a partial F-test of a forward selection method. In addition, the step of evaluating the performance is based on a p-value calculated from a F-statistic, or is determined by a impurity criterion; wherein the F-statistic represents as the following equation:

$$F = \frac{n-p-1}{p}\left(\frac{1-\Lambda}{\Lambda}\right) \sim F_{p,n-p-1},$$

wherein n is the sample size, p is the number of attributes, and $\Lambda$ is wilk's lambda (see EQ-1); and the impurity criterion represents as the following equation:

$$\text{Impurity} = \frac{N_L \times Gini(t_L) + N_M \times Gini(t_M) + N_R \times Gini(t_R)}{(N_L + N_M + N_R)},$$

wherein $N_L$ is the sample size of Node$_A$, $N_M$ is the sample size of Node$_N$, $N_R$ is the sample size of Node$_B$, $t_L$ is the gini value in Node$_A$, $t_M$ is the gini value in Node$_N$, and $t_R$ is the gini value in Node$_B$.

The method or multi-layer classifier of the present invention, wherein the step of evaluating the performance further comprises the following considerations:

(1) adding the attributes into the same layer of the discriminant analysis model established by the step (c), so that improves the differential power of the same layer of the discriminant analysis model; (2) adding the attributes into the undefined third class (Node$_N$) and creating a layer for establishing a model, the model continuously classifies the samples into the first class (Node$_A$), second class (Node$_B$), and undefined third class (Node$_N$) by providing the criterion to determine the at least one cut-point of the residual samples; (3) defining the first class (Node$_A$) as an undefined class, and then adding the attributes into the combination of the first class (Node$_A$) and undefined third class (Node$_N$) and creating a layer for establishing a model, the model continuously classifies into the first class (Node$_A$), second class (Node$_B$), and undefined third class (Node$_N$) by providing the criterion to determine the at least one cut-point of the residual samples; or (4) defining the second class (Node$_B$) as an undefined class, and then adding the attributes into the combination of the second class (Node$_B$) and undefined third class (Node$_N$) and creating a layer for establishing a model, the model continuously groups into the first class (Node$_A$), second class (Node$_B$), and undefined third class (Node$_N$) by providing the criterion to determine the at least one cut-point of the residual samples.

The present invention provides a new classification method as aforementioned, which has a model similar to the classification and regression trees (CART), splitting the samples layer by layer. The difference between the model of the present invention and CART is that the model classifies the samples into 1 or 2 classes in each layer and the unclassified samples left over to next layer for further classification. In addition, a linear combination of multiple attributes by the Fisher linear discriminant analysis can be used as the classifier at each layer. In order to construct the classifier method, the present invention provides a systematic methodology to select relevant attributes and proper cut-points. Adding the attributes into the model will be evaluated by the full model's performance to decide whether the model grows or not. To avoid the over-fitting problem, the present invention proposes a stopping criterion. Furthermore, the present invention also provides a method for selecting the attributes and deciding the cut-points. Therefore, the present invention can improve the accuracy of the method for classifier.

Other objects, advantages, and novel features of the invention will become more apparent from the following detailed description when taken in conjunction with the accompanying drawings.

DETAILED DESCRIPTION OF THE PREFERRED EMBODIMENT

Figure 2:
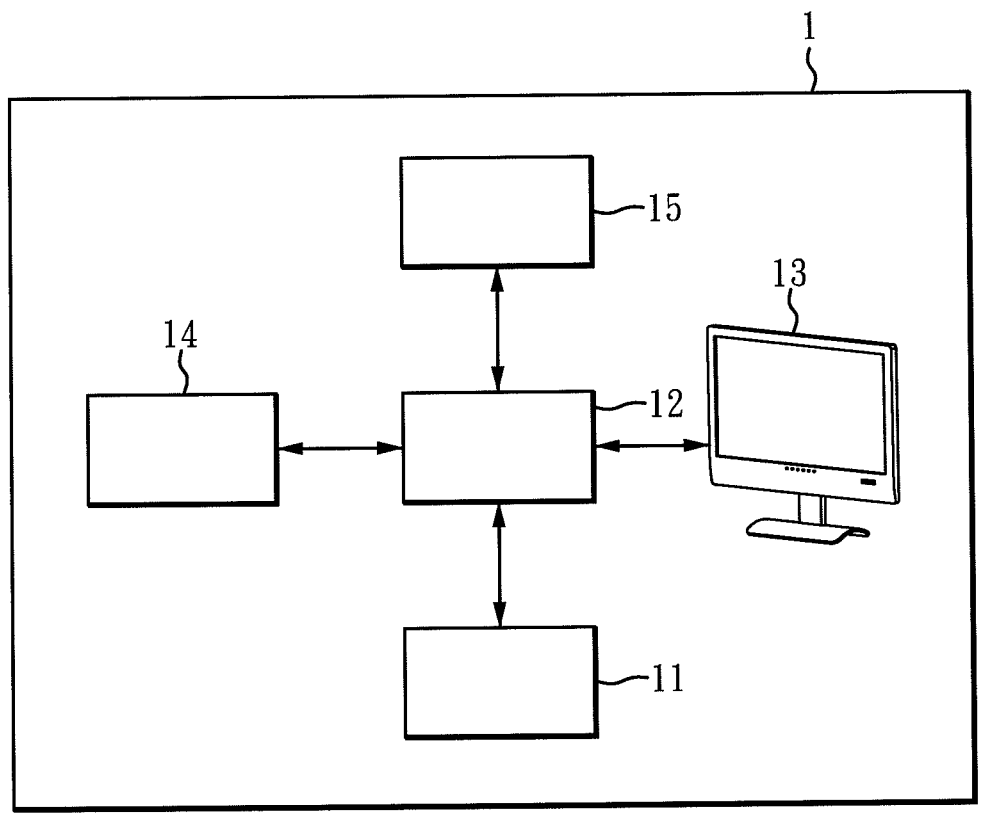
FIG. 2 is a scheme of a computer readable medium.

FIG. 2 shows a schematic graph of a computer readable medium for executing the multi-layer discriminant analysis method of the present invention.

As shown in FIG. 2, the computer readable medium stores a program to be executed by computer device 1 that comprises a display device 13, a processor 12, a memory 11, an input device 14, and a storage device 15. The input device 14 is used for the input of the data such as image, words characters, and commands to the computer readable medium. The storage device 15 may be a hard disc, an optical disk drive, or a remote database connected by Internet and is used for system programs, application programs, and user's data information storage. The memory 11 is used for temporarily data storage or program execution. The processor 12 is used for calculation and data processing. The display device 13 is used for output data displaying.

The execution of various application programs such as a document processing program, a graphics program, a science operation program, a browser, or electronic mail software in the computer readable medium shown in FIG. 2 may be progressed under an operating system. In the present example, the program for executing the multi-layer discriminant analysis method is firstly stored in the storage device 15, and the program is then loaded to the memory 11 when the multi-layer discriminant analysis method begins to be executed by the processor 12 of the computer readable medium. Finally, the resulted discriminated data is displayed on the display device 13 or is stored in a remote database.

Figure 1A:
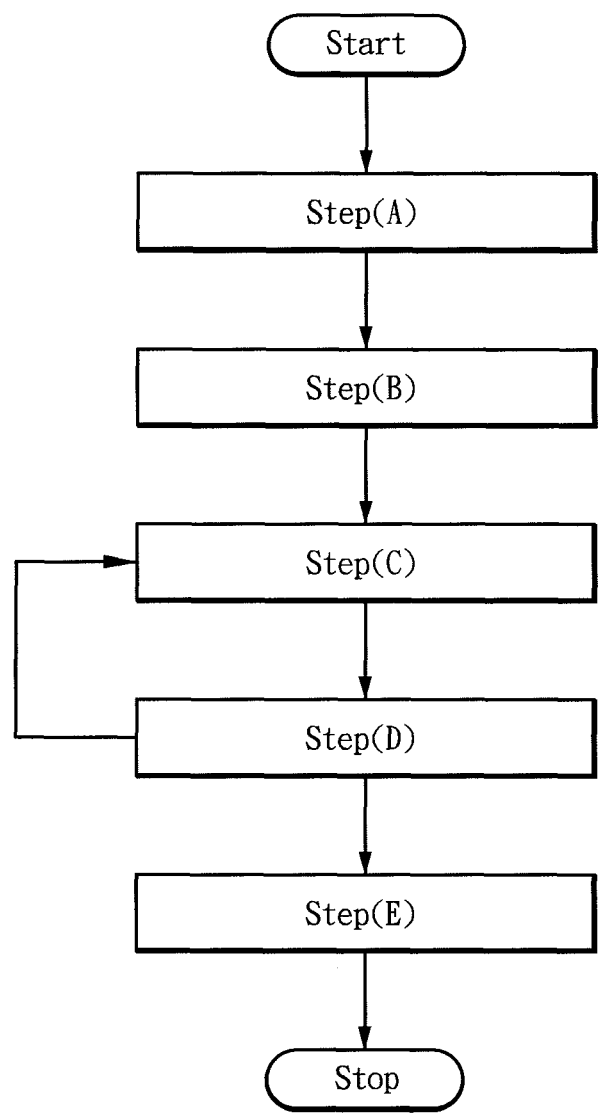
FIG. 1a is a flow chart of the multi-layer discriminant analysis method of the present invention.
Figure 1B:
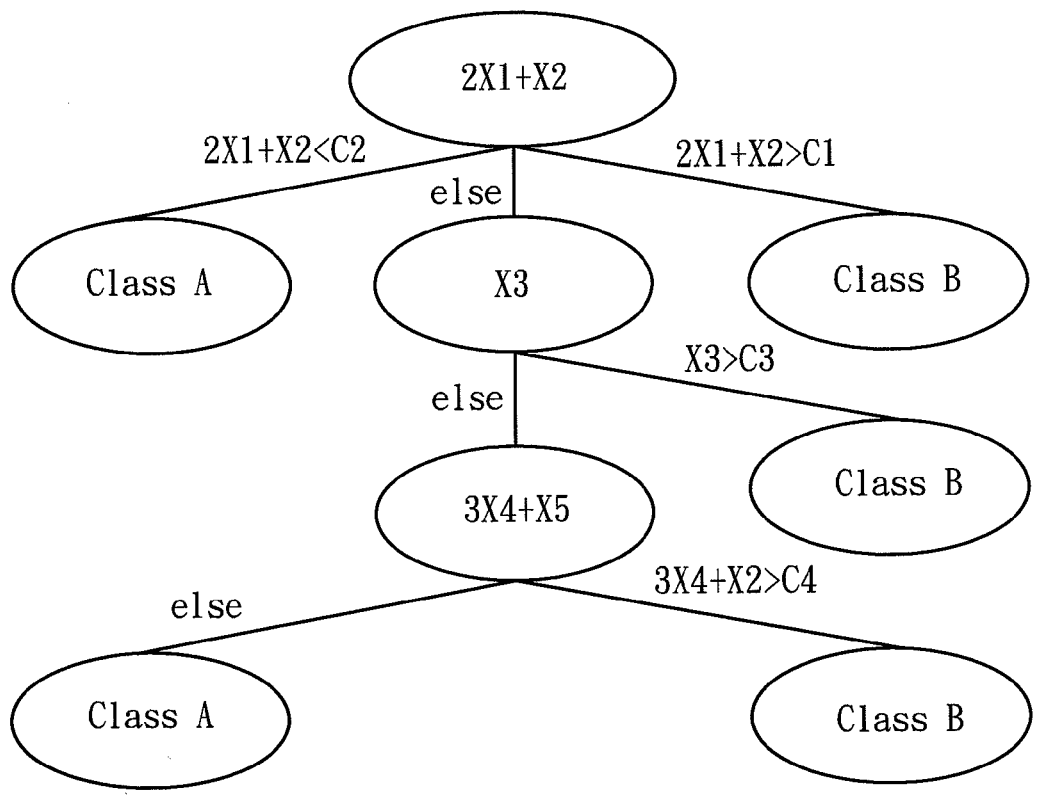
FIG. 1b is a scheme of a multi-layer discriminant analysis mode established by the multi-layer discriminant analysis method of the present invention.

Reference with FIG. 1a, a processing flow chart of the multi-layer discriminant analysis method of the present invention is shown. Also, a discriminant analysis model constructed from the discriminant analysis method shown in FIG. 1a is shown in FIG. 1b. The discriminant analysis model of the present invention has a continuous data discrimination processing structure as a conventional discriminant tree does. However, according to the present invention, the discrimination is made either on part of the samples or on the whole samples at each layer, in which the discriminated class (Node$_A$ or Node$_B$) and the samples thereof will not enter the next layer but only the un-discriminated class (Node$_N$) and the sample thereof will enter the next layer, and subsequently the un-discriminated class (Node$_N$) that entered the next layer will be discriminated with a new attribute. In the present invention, single class or two classes may be classified from the discrimination at each layer. If only single class is obtained from the discrimination at a layer, only single cut-point is determined for two parts division, in which one part remains at the present layer and the other part enters the next layer. If two classes are obtained from the discrimination at a layer, two cut-points are required for three parts division, in which one part is named the first class (Node$_A$), another part is named the second class (Node$_B$), and the other un-discriminated part is named the third class (Node$_N$). When a new attribute is added to the discriminant model, it can be progressed by adding and combining the new attribute with the attribute for increasing the discriminant accuracy at the layer, or by adding the new attribute to the next layer for discriminating the un-discriminated samples. New attributes are continuously added to the model until a stop criterion is satisfied.

Hereafter, the multi-layer discriminant analysis method and a discriminant analysis model constructed from the same of the present invention will be described in detail.

A plurality of sample is provided first, and an attribute is determined from a plurality of attributes depends on the significance obtained from the discrimination of the sample. Preferably, an attribute with the highest significance is chosen. Then, after the significance evaluation, at least one cut-point is provided from the criterion to determine at least one cut-point for determine of the belonging class ($Node_A$, $Node_B$, or $Node_N$) of the sample or determine of the sample being forward to the next layer. Therefore, the selection of the attribute and the cut-point is critical to the present invention. Model performance evaluation then proceeds by adding the attributes to the model and subsequently following with processing of significance evaluation. For example, an attribute is added to the original discriminant analysis model and followed by the data processing with the Fisher linear discriminant Analysis (FLD), or another layer is added to the model.

[Selection of Attribute and Selection Criterion]

RingPDVImax, VeinCentralVImin, VeinTDCentralVImax, TDVImax, CI, RMV, CI2, MCI3, or MI2 may be used as the attribute. As for the selection criterion, two rules can be used for attribute selection, one is Wilk's lambda that is usually applied to verify the difference between classes mean in a multi-variant statistical method, the other one is Gini index usually used as a measurement of impurity in the discriminant tree.

Wilk's Lambda

Assume there are g classes, p attributes, and $x_k \sim N_p(\mu_k, \Sigma)$, $k=1, 2, \ldots, g$ $$\begin{cases} H_0: \mu_1 = \mu_2 = \ldots = \mu_g \\ H_1: H_0 \text{ is not true,} \end{cases}$$

wherein $H_0$ is the null hypothesis, $H_1$ is the alternative hypothesis, and $\mu_k$ is the mean of class k.

*Wilk's lambda:* (EQ-1)

$$\Lambda = \frac{|W|}{|B+W|}$$
$$= \frac{1}{|I + W^{-1}B|}$$
$$= \prod_{i=1}^{p} \frac{1}{1+\lambda_i}$$

wherein W is the within classes covariance matrix; B is the between classes covariance matrix; I is identity matrix, and $\lambda_i$ is the eigenvalue of $W^{-1}B$ If $H_0$ is true, $\Lambda$ follows F-distribution (EQ-2) after transformation test statistic $$y = \Lambda^{\frac{1}{s}}, F = \frac{1-y}{y}\frac{m_2}{m_1} \sim F_{m_1, m_2}$$ (EQ-2)

$$s = \sqrt{\frac{p^2(g-1)^2 - 4}{p^2 + (g-1)^2 - 5}}$$

$$m_1 = p(g-1), m_2 = s[n - (p - g + 2)/2] - \frac{p(g-1)}{2} + 1$$

When $p \geq 1$, $g=2$, $s=1$, $m_1=p$, $m_2=n-p-1$, and F-statistic can be reduced to $$F = \frac{n-p-1}{p}\left(\frac{1-\Lambda}{\Lambda}\right) \sim F_{p, n-p-1}$$

Wilk's lambda can also be transfer to chi-square ($\chi^2$) distribution.

F-statistic is preferred when classes number is small. Herein, F-statistic is used because only two classes are preferably taken for the multi-layer discriminant analysis.

The p-values calculated from the above F-statistic represent the differences between the classes mean of the attributes, whereas the between-classes has a high significance when the p-value is small. Hence, an attribute with the highest significance can be chosen by comparing the p-values thereof.

Gini Index

A discrimination rule is required to evaluate the efficiency of the attribute and the cut-point because preferred or most preferred attribute and cut-point are demanded at each discrimination step. Gini index is a commonly used discrimination rule, which represents the evaluation of impurity, and therefore a small Gini index is preferable herein. Gini index is obtained from the combination of an attribute and a corresponding cut-point, in which a preferred cut-point can be found from a selected attribute. Therefore, the selection of the variable can be carried out by comparing the Gini indexes of each combination of an attribute and a corresponded cut-point first and subsequently following with choosing a most preferred attribute and cut-point in the discrimination.

The Gini Index should be:

$$Gini(t) = \sum_{i \neq j} P(i|t)P(j|t);$$ (EQ-4)

the impurity is represented as $$\frac{n_L}{N} Gini(t_L) + \frac{n_R}{N} Gini(t_R);$$

wherein
t is $Node_L$, $Node_N$ or $Node_R$;
P(i|t) represents the conditional probability of i in $Node_t$;
P(j|t) represents the conditional probability of j in $Node_t$;
$n_L$ represents the number of the sample at the left side of the cut-point t;
$n_R$ represents the number of the sample at the right side of the cut-point t; and
$N = n_R + n_L$, N represents the total number of the sample In a conventional discriminant tree method, division comprising single cut-point for two parts is proceeding at each layer. In the contrast, two cut-points are required at each layer in the present invention, and therefore the impurity can be represented as:

$$\text{Impurity} = \frac{N_L \times Gini(t_L) + N_M \times Gini(t_M) + N_R \times Gini(t_R)}{(N_L + N_M + N_R)}$$ (EQ-5)

In the present invention, an attribute with a minimum impurity can be obtained by comparing each impurity of the combinations of attributes and the corresponded cut-points.

When a new attribute is added to the same layer, the impurity can be calculated from the discriminant efficiency of the combination of the new attribute with the original attribute by the FLD. Therefore, an attribute with the lowest impurity is obtained.

[The Selection of Cut-Point]

In the present invention, three methods are available for the selection of cut-point, which comprises Gini index, Mahalanobis distance, and Youden's Index.

Gini Index

During the selection of attributes, a couple of cut-points is required for each attribute to obtain its impurity, and therefore a method is required to find out the couple of cut-points with minimal impurity. However, in a discriminant tree method, since only single cut-point is used, each possible cut-point can be tested for the impurity calculation to find a proper cut-point having minimal impurity. For example, if a sample size of N is provided, there exist N kinds of possible cut-points waiting for testing while a single cut-point is required for a two classes division. Alternatively, N(N−1)/2 kinds of possible cut-points should be tested when a couple of cut-points is required for a three classes division. However, when the sample sizes goes very large, the process of cut-points searching will take a very large effort and very long time for completion. In contrast, the present invention provides a very simple method for the two cut-points searching to resolve the problem illustrated above.

Figure 3:
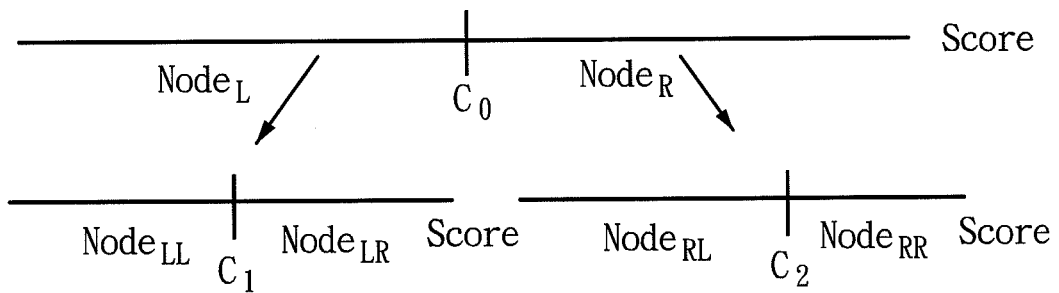
FIG. 3 is a scheme of selecting cut-points based on Gini index according to one preferable embodiment of the present invention.

First, a cut-point ($C_0$) that divides the sample into two classes (Node$_L$ and Node$_R$) having minimal impurity is found. Then, another cut-point ($C_1$) in the Node$_L$ to divide the Node$_L$ into two classes having minimal impurity is found, and also a cut-point ($C_2$) in the Node$_R$ to divide the Node$_R$ into two classes having minimal impurity is found. In this way, three cut-points, $C_0$, $C_1$, and $C_2$, are obtained as shown in FIG. 3, and these three cut-points can be combined into three cut-point sets, ($C_0$, $C_1$), ($C_1$, $C_2$), and ($C_0$, $C_2$). The sample is classified into three classifies by these three cut-point sets, and the impurity of each group is compared to reach a most favored cut-point set, in which samples with high homogeneity are preferably placed in the same left or right group. Therefore, some limitations should be set while searching for the cut-point $C_1$ for the sample that is divided by $C_1$ and far from the cut-point $C_0$ to have a higher impurity than the other sample does. Also, some limitations, for example, Gini($t_{LL}$)<Gini($t_{LR}$), Gini($t_{RR}$)<Gini($t_{RL}$), should be set while searching for the cut-point $C_2$. Base on the above method, only 2N times for searching the three cut-points ($C_0$, $C_1$, and $C_2$) and following with comparing the three cut-point sets after determine of the three cut-points should be taken.

Mahalanobis Distance

In the present invention, another method used for the cut-point selection is Mahalanobis distance. The difference between Mahalanobis distance and the Euclidean distance is that not only consider the difference from the sample to class mean, but also consider the distribution of each class in the Mahalanobis distance. For example, in the case that the variance of class A is larger than that of class B, and the distribution of the class B is more concentrated than that of the class A, when the distance from the class mean of the class A is the same as that to the class mean of the class B, Mahalanobis distance from the sample to the class A is less than that to the class B. Hence, this sample is considered to be classified into the class A.

The application of Mahalanobis distance to the classification is described in detail hereafter. First, when there are two classes, Mahalanobis distance of a sample point x from class A is defined as: $D_A(x)=\sqrt{(x-\mu_A)^T S_A^{-1}(x-\mu_A)}$, and Mahalanobis distance of the sample point x from a class B is defined as: $D_B(x)=\sqrt{(x-\mu_B)^T S_B^{-1}(x-\mu_B)}$. $\mu_A=(\mu_{A1}, \mu_{A2}, \ldots \mu_{Ap})$ is the mean of the class A, and $S_A$ is the covariance matrix of the class A. $\mu_B=(\mu_{B1}, \mu_{B2}, \ldots \mu_{Bp})$ is the mean of class B, and $s_B$ is the covariance matrix of class B. In the case of $D_A(x)<D_B(x)$, the sample x is considered to be classified into the class A; and in the case of $D_A(x)>D_B(x)$, the sample x is considered to be classified into the class B.

In a multi-layer discriminant analysis model, plural samples are classified in to three groups, i.e. class A (Node$_A$), class B (Node$_B$), and undefined class (Node$_N$). Hence, the samples classified into the class A ($D_A(x)<D_B(x)$) are used to calculate a new set of $\mu_{A1}$, $\mu_{B1}$, $S_{A1}$, and $S_{B1}$, and then the samples classified into the class A are calculated again with the new set of means and variances to obtain the Mahalanobis distance: $D_{A1}(x)=\sqrt{(x-\mu_{A1})^T S_{A1}^{-1}(x-\mu_{A1})}$, and $D_{B1}(x)=\sqrt{(x-\mu_{B1})^T S_{B1}^{-1}(x-\mu_{B1})}$. In the case of $D_{A1}(x)<D_{B1}(x)$, the sample x is considered to be classified into the class A; and in the case of $D_{A1}(x)>D_{B1}(x)$, the sample x is considered to be classified into the undefined class.

Similarly, the samples classified into the class B ($D_A(x)>D_B(x)$) are used to calculate a new set of $\mu_{A2}$, $\mu_{B2}$, $S_{A2}$, and $S_{B2}$, and then the samples classified into the class B are calculated again with the new set of means and variances to obtain the Mahalanobis distance: $D_{A2}(x)=\sqrt{(x-\mu_{A2})^T S_{A2}^{-1}(x-\mu_{A2})}$, and $D_{B2}(x)=\sqrt{(x-\mu_{B2})^T S_{B2}^{-1}(x-\mu_{B2})}$. In the case of $D_{A2}(x)>D_{B2}(x)$, the sample x is considered to be classified into the class B; and in the case of $D_{A2}(x)<D_{B2}(x)$, sample x is considered to be classified into the undefined class.

Figure 4A:
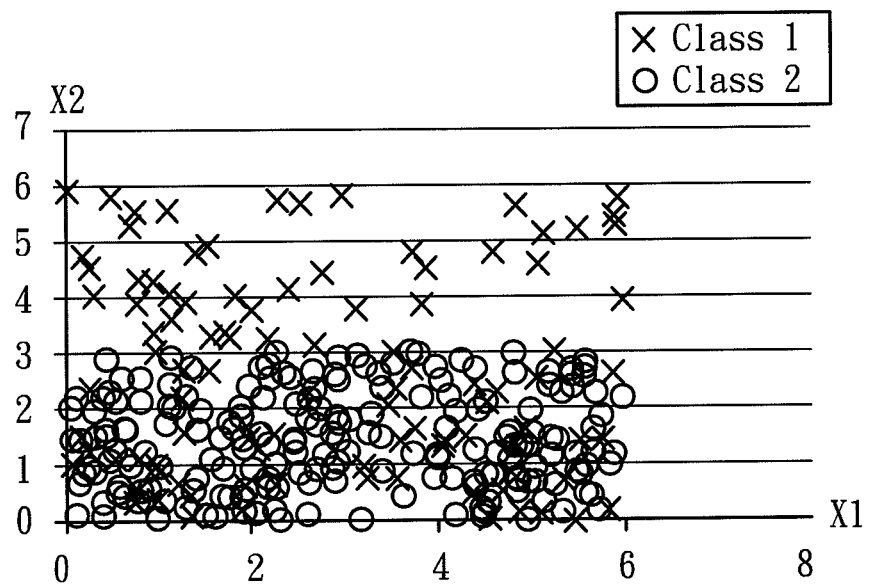
FIGS. 4a to 4b are schemes of correcting the Mahalanobis distanceby using Gini index of the present invention.
Figure 4B:
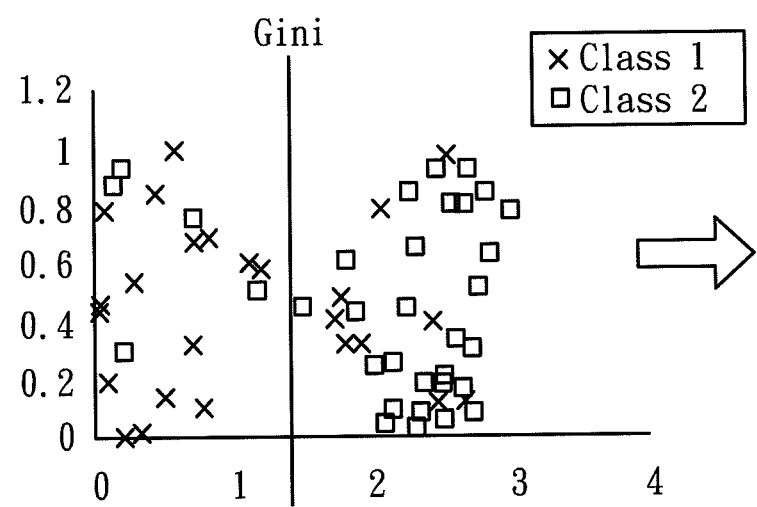
Figure 4B:
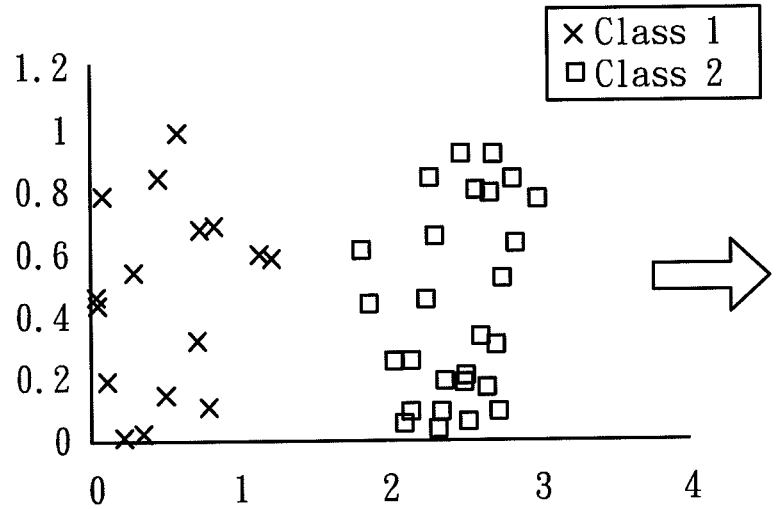

In a multi-layer discriminant analysis model of the present invention, when Mahalanobis distance is used to select cut-points to classify the samples into two classes, i.e. the class A and the class B. Then, the subset of these two classes is used to select the desired cut-points. However, when the subset of these two classes in a condition shown in FIG. 4a, the selection of cut-points may decrease the accuracy of the undefined class. In order to solve the problem that the uncertainty of the cut-points caused by the extreme differences between the sample size of classes, Gini index can further be used to correct Mahalanobis distance (as shown in FIG. 4b). First, Gini index is used to define a cut-point, and the samples are classified into two sub-classes by this cut-point. Then, the proportions of each class contained in these two sub-classes are compared. When the proportion of the class A contained in the left sub-class is larger than that contained in the right sub-class, the samples contained in the right sub-class is removed. On the contrary, when the proportion of the class A contained in the right sub-class is larger than that contained in the left sub-class, the samples contained in the left sub-class is removed. Similarly, the proportions of the class B contained in these two sub-classes are also compared in the same way, and the samples contained in the sub-class with less proportion is removed. Finally, the means and the variances of the remained samples of the classes A and B are calculated again, and Mahalanobis distance corrected by Gini index is obtained.

Youden's Index

First, the definition of Youden's index is "Youden's index=specificity+sensitivity−1", wherein the "specificity"

means the proportion that the samples of the class A (benign) in plural samples determined accurately, and the "sensitivity" means the proportion that the samples of the class B (malignant) determined accurately. Hence, Youden's index with high value would be preferred.

Herein, the method for selecting a cut-point is similar to the method using Gini index. First, all the points able to divide the sample into two groups are calculated, and the point with maximum Youden's index, i.e. the is the cut-point, $C_0$, is found. Then, the sample is classified into $Node_L$ and $Node_R$ by using $C_0$. Likewise, a new point with maximum Youden's index, i.e. the new cut-point, $C_1$, which can classify $Node_L$ into two groups is found through similar computation. Subsequently, another new Youden's index, i.e. the cut-point $C_2$, which can classify $Node_R$ into two groups, can be found. In this way, three cut-points, $C_0$, $C_1$ and $C_2$, are obtained, and these three cut-points can be combined into three cut-point sets, i.e. ($C_0$, $C_1$), ($C_1$, $C_2$), and ($C_0$, $C_2$). The sample is classified into three groups by these three cut-point sets. By comparing Youden's index of the three groups, a preferred cut-point set can be obtained.

When the sample is classified into three groups, the calculation of specificity and sensitivity has to be correct since there is an undefined group. The correction is shown as follow:

Specificity=(number of correct samples in the class A+0.5*number of undefined samples in the class A)/number of total samples in the class A; and Sensitivity=(number of correct samples in the class B+0.5*number of undefined samples in the class B)/number of total samples in the class B.

Then, a cut-point set with maximum Youden's index is selected.

[Evaluation of the Model Performance]

In a multi-layer discriminant analysis model, when each attribute is added into the model, an evaluation is performed by the following four different cases.

Figure 5:
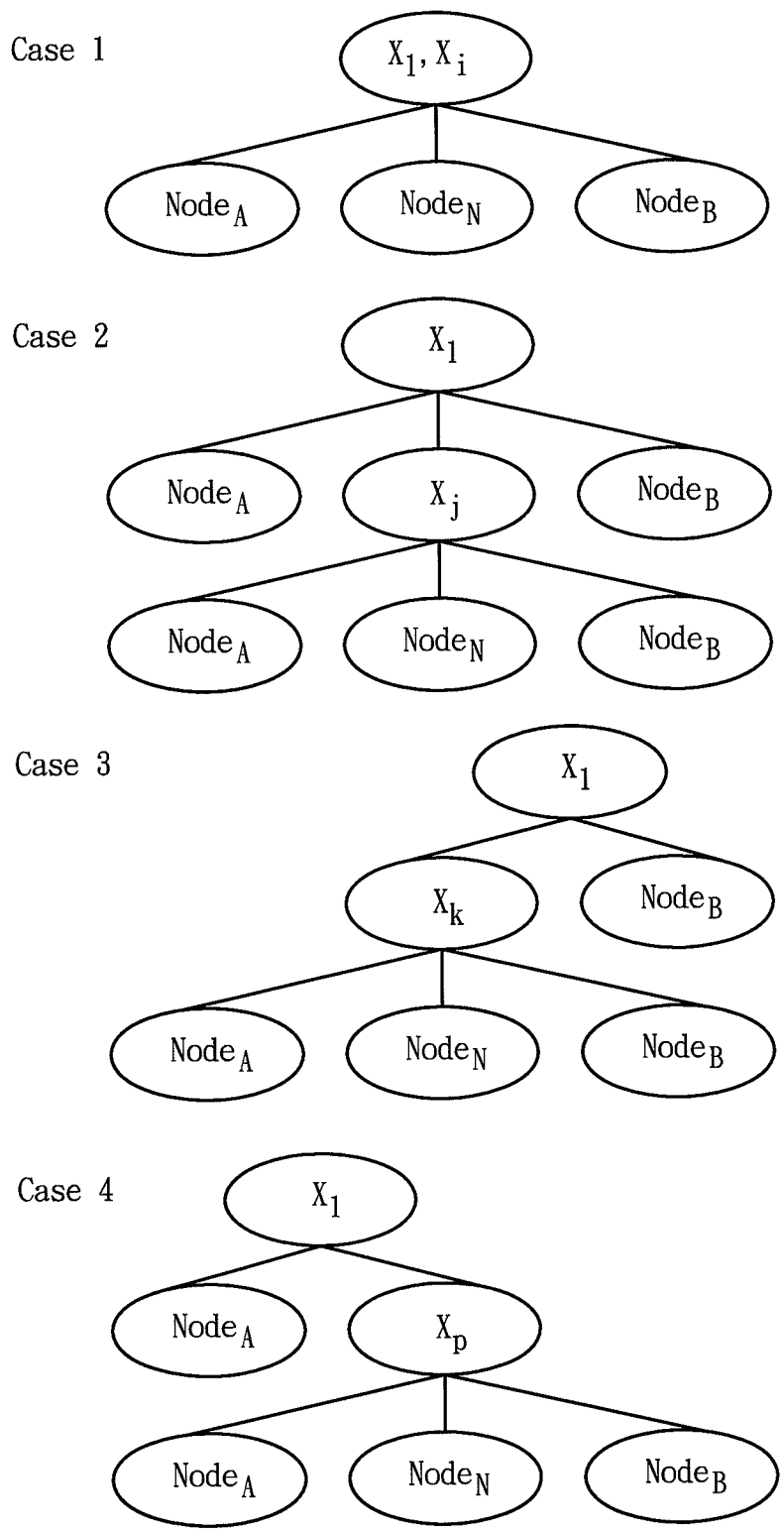
FIG. 5 is a scheme of the four cases for evaluating the model performance.

First, as shown in FIG. 5, a layer of the model consisting of $X_1$ is provided, and the sample is classified into three groups by $X_1$. These three groups are a class A ($Node_A$), a class B ($Node_B$), and an undefined class ($Node_N$).

Case 1:

A new attribute $X_i$ is added into the original layer, and is combined with by use of FLD to increase the discrimination of the original layer.

Case 2:

A new attribute $X_j$ is added into the $Node_N$ to build a model, and the model is used to distinguish the sample, which cannot be distinguished by the original layer.

Case 3:

The sample in $Node_A$, and the sample in $Node_N$ are combined, and the combined sample is represented by $Node_{AN}$. The model consisting of $X_1$ is only used to differentiate the class B. Then, a new attribute $X_k$ is added into $Node_{AN}$ to build a new model. Herein, the new model can be used to distinguish the sample, which cannot be distinguished by the original layer.

Case 4:

The sample in $Node_B$, and the sample in $Node_N$ are combined, and the combined sample is represented by $Node_{BN}$. The model consisting of $X_1$ is only used to differentiate the class A. Then, a new attribute $X_p$ is added into $Node_{BN}$ build a new model. Herein, the new model can be used to distinguish the sample, which cannot be distinguished by the original layer.

[Stop Criterion]

In a multi-layer discriminant analysis model of the present invention, the stop criterion can be classified into two types. One type of the stop criterion is to determine whether the undefined sample is kept on classification or not. The other type of the stop criterion is to determine whether a new attribute is added into the original layer or not.

The discrimination, which is used to determine whether the undefined sample is kept on classification or not, can be performed by use of Wilk's lambda mentioned in the attribute selection. If a null hypothesis is not rejected, it means that an attribute, which can differentiate classes specifically, is found in the remained sample.

The other type of the stop criterion is to determine whether a new attribute is added into the original layer or not. The original model already has some significant attributes. Hence, when a new attribute is added into the original layer, the most important factor is to consider the variances interpreted by the new added attribute, not to consider the significance of the entire model after adding the new attribute. Herein, the partial F-test used in the forward selection of the regression analysis can be taken into reference. According to the partial F-test, the difference between the original model and the new model with an attribute added therein is examined. If a null hypothesis is rejected, it means that there is no significant modification after a new attribute is added into the original model. In this case, this attribute will not be added into the original model. The examined model is represented by (EQ-6):

$$\begin{cases} H_0: y = \beta_0 + \beta_1 X_1 + \beta_2 X_2 & \text{(full model)} \\ H_1: y = \beta_0 + \beta_1 X_1 & \text{(reduce model)} \end{cases} \quad (EQ\text{-}6)$$

$$F = \frac{SSR(X_1, X_2) - SSR(X_1)}{df_R - df_F} \div \frac{SSE(X_1, X_2)}{df_F}$$

$$= \frac{SSR(X_1 \mid X_2)}{df_R - df_F} \div \frac{SSE(X_1, X_2)}{df_F}$$

wherein, $df_F$ is a degree of freedom of the full model; $df_R$ is a degree of freedom of the reduce model;

$\beta_0$, $\beta_1$, $\beta_2$ are coefficients of variables; and

SSR represents explained sum of square and SSE represents residual sum of square.

According to the forward selection of the regression analysis, the model is represented by (EQ-7):

If a null hypothesis is rejected, it means that it does not have to add a new attribute into the original model.

$$\begin{cases} H_0: d = \omega_1 X_1 + \omega_2 X_2 & \text{(full model)} \\ H_1: y = \omega_1 X_1 & \text{(reduce model)} \end{cases} \quad (EQ\text{-}7)$$

$$F = \frac{S_B(X_1, X_2) - S_B(X_1)}{S_W(X_1, X_2)};$$

wherein ω1 and ω2 are coefficients of variables, $S_B$ is between group variability, and $S_W$ is within group variability.

If the new added attribute is significant enough, a method for evaluation of the model effectiveness has to be performed to compare the effectiveness of the entire model before and after a new attribute is therein added. If the effectiveness of the entire model is not improved after a new attribute is therein added, the addition of new attribute is stopped. It should be noted that, in the method for multi-layer classifier of the present invention and the multi-layer discriminant analysis model built by the method for multi-layer classifier, the last layer of the model is forced to classify all samples, and no undefined sample remains.

Figure 6:
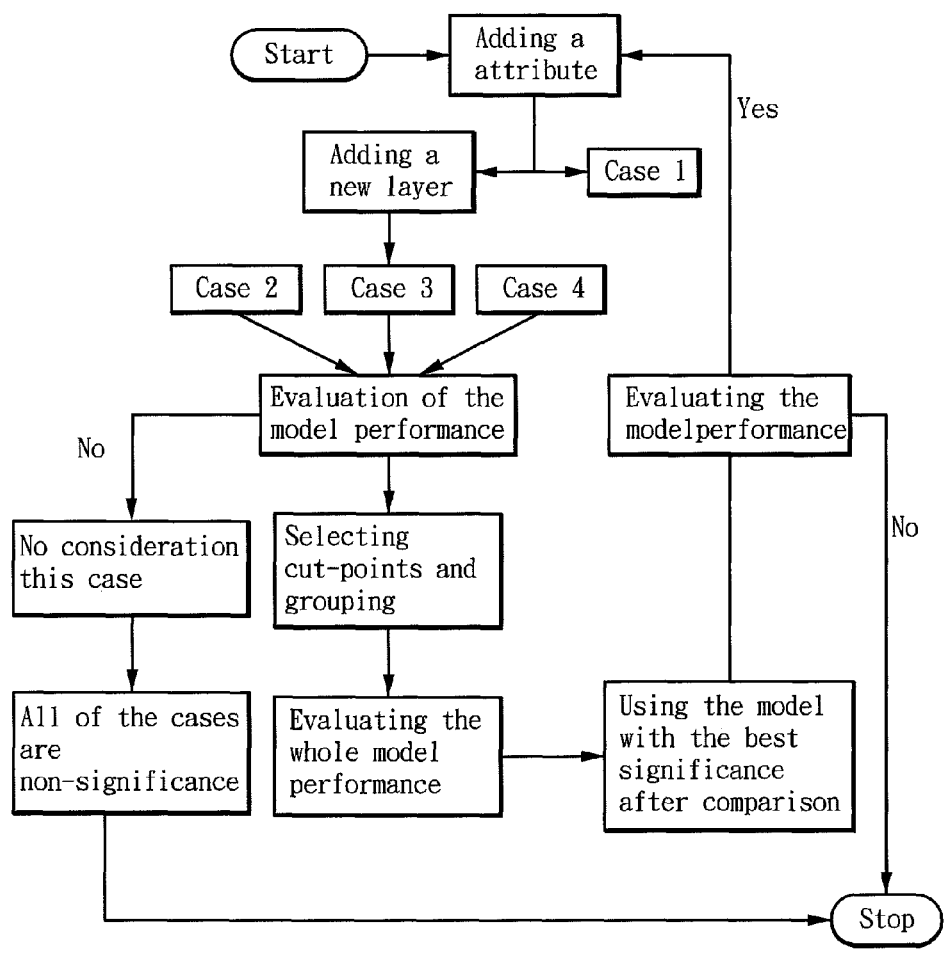
FIG. 6 is a detailed flow chart of the multi-layer discriminant analysis method of the present invention.

According to the aforementioned parameters and conditions, the detailed flow chart using the multi-layer discriminant analysis model of the present invention is shown in FIG. 6.

First, plural samples are provided (not shown in the figure), and the most significant attribute is selected by Wilk's lambda or Gini index. Then, this attribute is examined to find out whether it can discriminate each class or not. If a null hypothesis is rejected, it means that this attribute has an interpretation. After that, a best cut-point set in this attribute is found by use of Mahalanobis distance or Gini index, and the samples are classified into a first class (class A, $Node_A$), a second class (class B, $Node_B$), and an undefined third class ($Node_N$). The samples in these three classes can be used to evaluate the effectiveness of the model.

When a second attribute is selected, the location where the second attribute added therein has to be evaluated. The evaluation can be performed by the aforementioned four cases: (case 1) finding the best attribute and a cut-point after those combined with the original variances in the original layer; (case 2) finding the most suitable attribute and a cut-point from the original undefined samples; (case 3) taking the class A into undefined samples, and using the samples in the class A and the original undefined samples to find the most suitable attribute and cut-point; and (case 4) taking the class B into undefined samples, and using the sample in the class B and the original undefined samples to find the most suitable attribute and cut-point.

After the attribute is selected into each case, the significance of each case has to be examined by use of Wilk's lambda. If a case is not considered significant enough, this case should be abandoned. Then, the aforementioned evaluation of model performance is performed to evaluate the model performance in each case. If the model using the case 1 has best performance, the new attribute is added into the original layer. If the model using the case 2 has best performance, the remained undefined sample in the upper layer is used to build a new layer model. If the model using the case 3 or 4 has best performance, the class A or the class B in the upper layer is taken into undefined, and all the remained undefined samples are used to build a new layer model. In addition, the upper layer model is transferred to a model with only one cut-point for determining the class A or the class B, and not determining two classes in one layer. If a new attribute is added into a model with n layers, n kinds of conditions are generated when the new attribute is added into n layers. Furthermore, when the model is evaluated by the cases 2, 3, and 4, there are n+3 kinds of conditions generated totally. If the new variances generated in these n+3 kinds of condition are not significant, the model should be stopped. If several cases satisfy the significant requirement, a case with best model performance is selected. Then, an evaluation is performed on the entire model after an attribute is added into the selected case, to check whether the model performance is improved or not. If the model performance is not improved, the step of adding new attributes is stopped. If the model performance is improved, new attributes are kept on adding into the model, until the performance of the model cannot be improved by adding new attributes.

In conclusion, the present invention provides a method for selecting attributes systemically, based on a multi-layer discriminant analysis model. According to the method of the present invention, it is possible to select attributes by using Gini index or the p value, wherein the p value is generated by transforming Wilk's lambda into F distribution. In the determination of cut-points, the present invention also provides methods using the Mahalanobis distance, and Gini index. In the conventional method, during the process of determining a cut-point by Gini index, at least one cut-point has to be searched. Hence, searching for all possible cut-points leads to the process very time-consuming. Therefore, the present invention also provides a faster method for searching a desired cut-point. In addition, when Mahalanobis distance is used to determine at least one point, all samples are classified into a class A and a class B and used to determine the cut-points. However, when the samples are classified into two classes by the Mahalanobis distance, the differences between the classes sample size are great, and these big differences may cause the uncertainty of the cut-points determined by Mahalanobis distance. Hence, the present invention provides method to solve the aforementioned problem by using Gini index to correct Mahalanobis distance. Furthermore, according to the method of the present invention, not only the performance of a model with one layer is considered, but also the performance of the entire model is considered when each new attribute is added into the model. After the performance of the entire model is considered, which layer the new attribute added in is determined. Besides, with regard to the stop criterion of the model, the present invention also provides a method used Wilk's lambda to prevent the over-fitting problem. Hence, the method of the present invention can greatly improve the accuracy of the classification.

Example 1

Figure 7A:
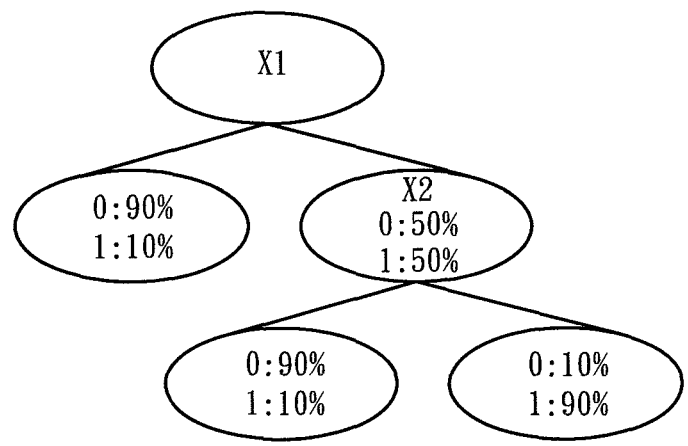
FIGS. 7a to 7d are schemes of the embodiment 1 of the present invention.
Figure 7B:
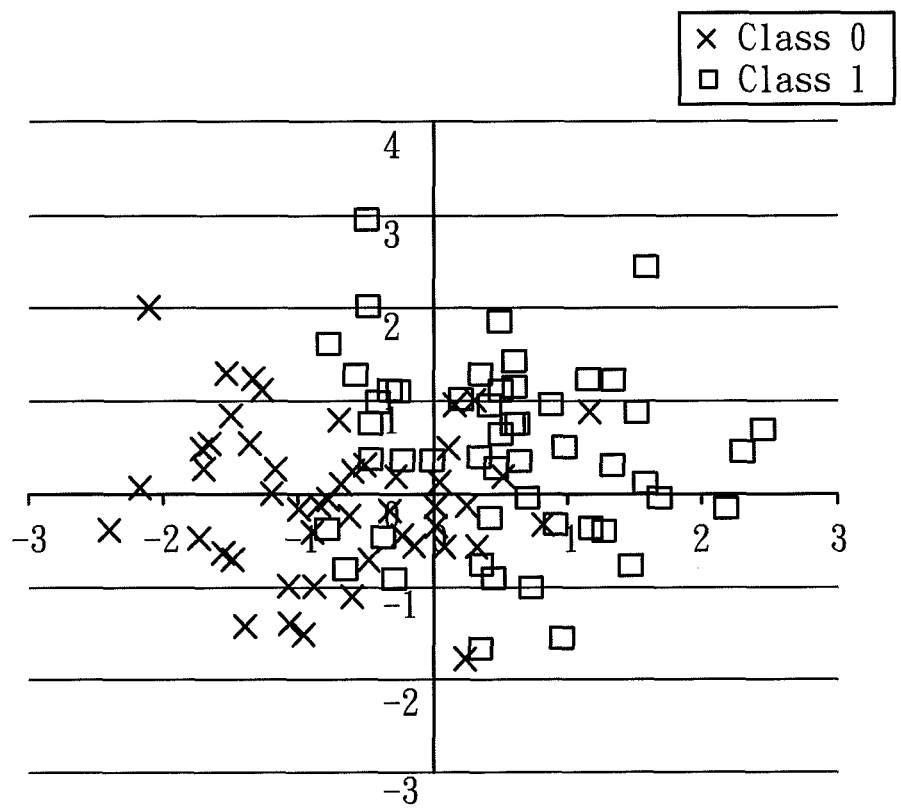

In the present example 1, a sample having two classes, five attributes $(X_1, X_2, \ldots, X_5)$, and a sample size of 100 is used, wherein the sample distribution is as shown in FIG. 7b. A preset model is as shown in FIG. 7a. Herein, $X_1$ represents the first layer, and the other sample that cannot be classified are taken to a next layer, $X_2$.

Figure 7C:
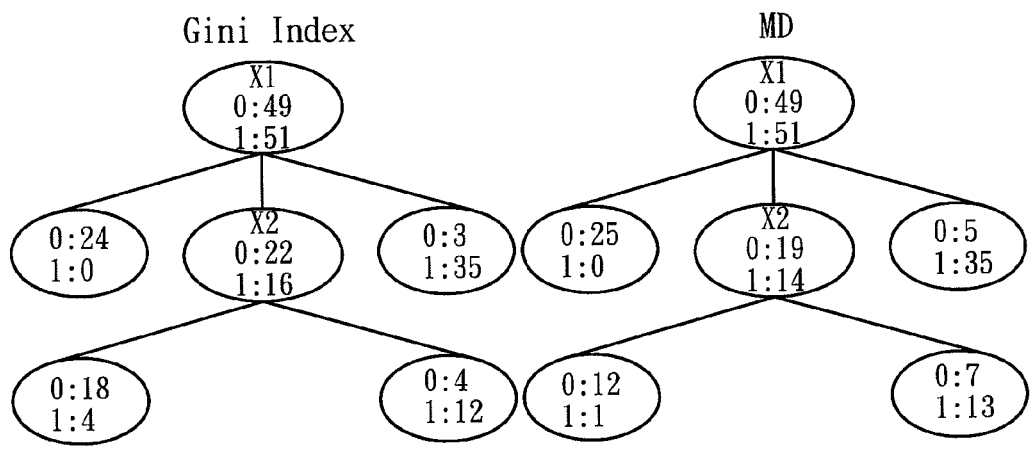
Figure 7D:
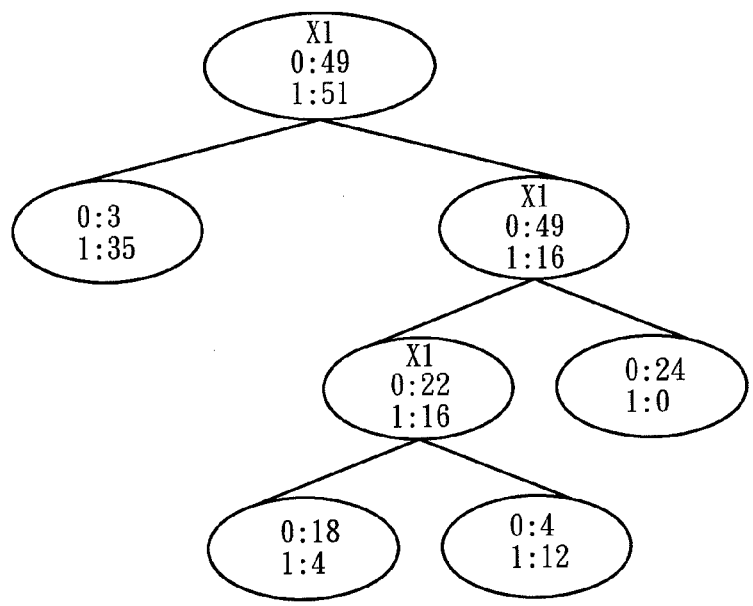

The results after the classification by the multi-layer classifier are shown in FIG. 7c. The results obtained by gini index and Mahalanobis distance for searching the cut-point applied in the multi-layer discriminant analysis model are shown respectively. Besides, the result obtained by using the CART is shown in FIG. 7d. Comparing the two methods of multi-layer discriminant analysis using gini index and CART, it is shown that the rules for searching the cut-points there between are the same. Reference with FIG. 7c (left), according to the multi-layer discriminant analysis, a class (0) and a class (1) are output at the first layer, in which the class (0) comprises 24 sub-classes (0) and zero sub-classes (1), the class (1) comprises 3 sub-classes (0) and 35 sub-classes (1). Reference with FIG. 7d, according to the method of CART, a class (1) comprising 3 sub-classes (0) and 35 sub-classes (1) is divided at the first layer using X1, and then a class (1) comprising 24 sub-classes (0) and zero sub-classes (1) is divided at the second layer using X2. Though the same results are obtained, the discriminability for two classes using one attribute at the same layer is revealed by using the multi-layer discriminant analysis method of the present invention. In the contrast, two and more layers are required in the method of CART because only single class can be discriminated at each layer using one attribute, another class should be discriminated at the next layer using the same attribute.

The results of different methods used are shown in table 1, in which the result of the multi-layer discriminant analysis method using gini index and the result of CART are similar.

TABLE 1

| | Multi-layer FLD cutpoint: Gini index | Multi-layer FLD cutpoint: MD | CART | FLD |
|---|---|---|---|---|
| Accuracy | 0.89 | 0.85 | 0.89 | 0.83 |

Example 2

Figure 8A:
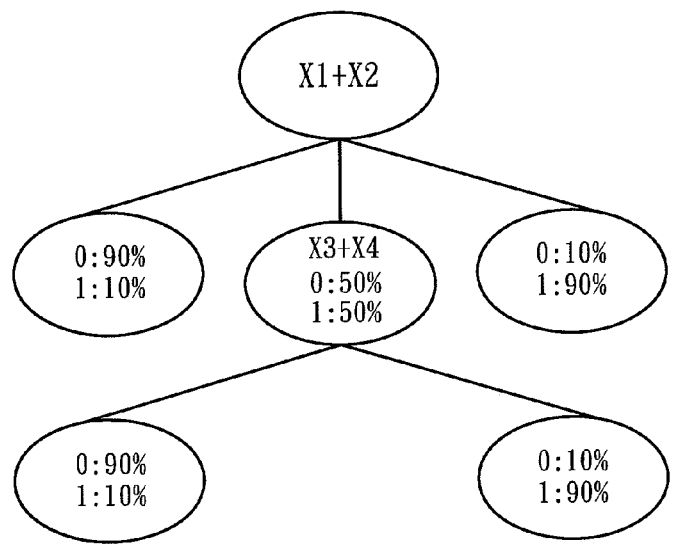
FIGS. 8a to 8c are schemes of the embodiment 2 of the present invention.

In the present example 2, a sample having two classes, ten attributes $(X_1, X_2, \ldots, X_{10})$, and a sample size of 200 is used, wherein each attribute satisfies $N(0,1)$. A preset model is shown in FIG. 8a, in which a combination of $X_1$ and $X_2$ is selected to form a FLD model at the first layer, the samples which cannot be classified at the first layer will be further classified at the second layer by using the FLD model with the combination of $X_3$ and $X_4$.

Figure 8B:
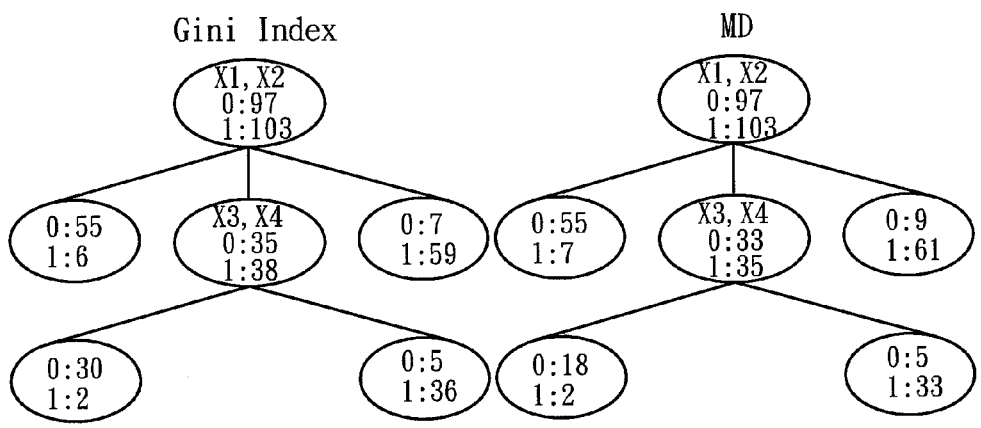
Figure 8C:
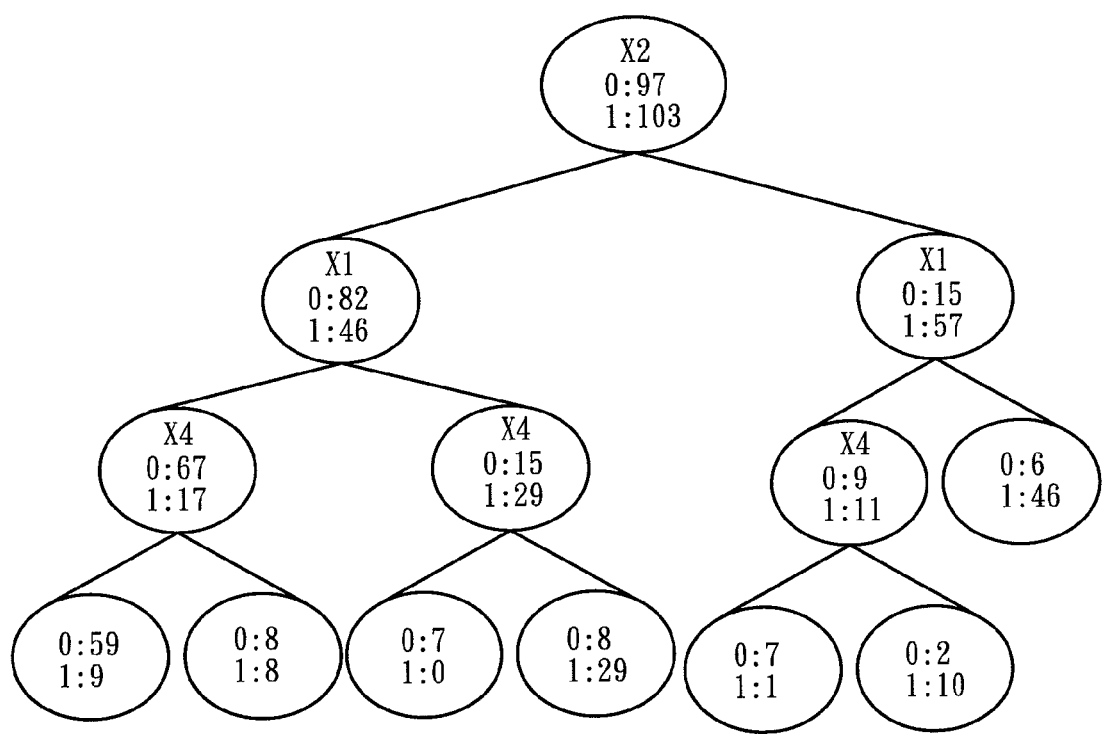

The result obtained by the multi-layer discriminant analysis method is shown in FIG. 8b, and the result obtained by the CART method is shown in FIG. 8c.

According to the results shown in the table 2 of the present example 2, the accuracy of the multi-layer discriminant analysis method using either gini index or Mahalanobis distance is higher than the accuracy of the CART or FLD methods.

TABLE 2

| | Multi-layer FLD cutpoint: Gini index | Multi-layer FLD cutpoint: MD | CART | FLD |
|---|---|---|---|---|
| accuracy | 0.9 | 0.885 | 0.83 | 0.88 |

Example 3

Figure 9A:
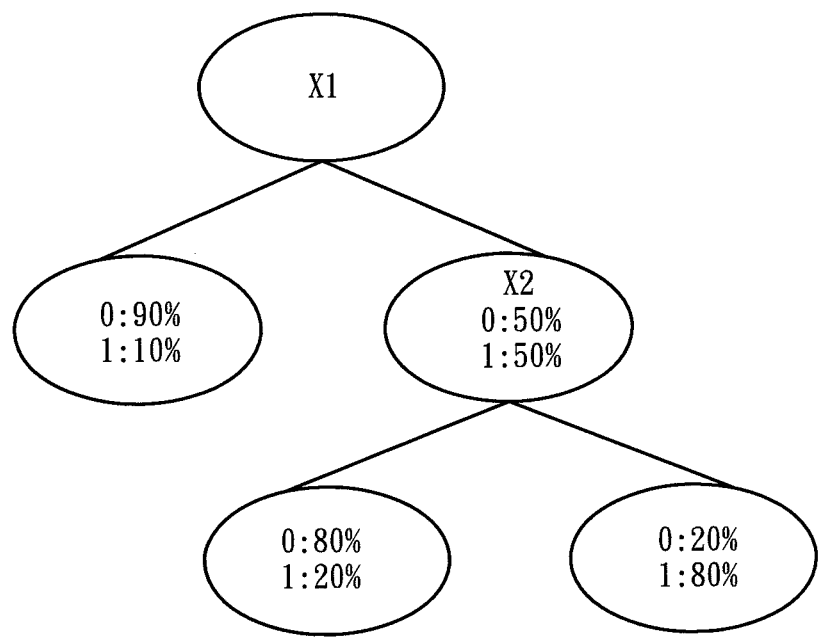
FIGS. 9a to 9d are schemes of the embodiment 3 of the present invention.
Figure 9B:
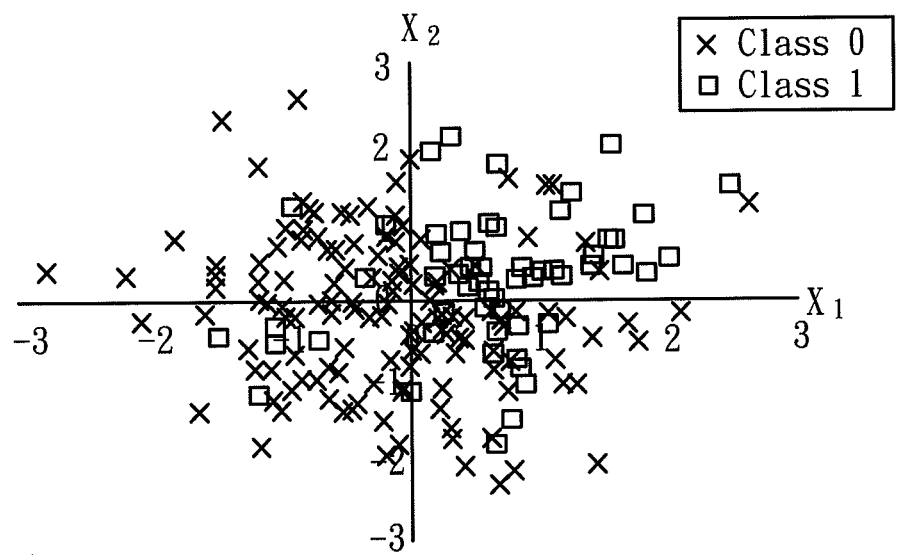

In the present example 3, a sample having two classes, five attributes $(X_1, X_2, \ldots, X_5)$, and a sample size of 1000 is used, wherein each attribute satisfies $N(0,1)$. A preset model is shown in FIG. 9a, in which at the first layer the sample is classified by $X_1$. Because only the sub-class (0) can be discriminanted at the first layer by $X_1$, the other sample that cannot be classified at the first layer with $X_1$ is taken to the next second layer for further classification with $X_2$.

Figure 9C:
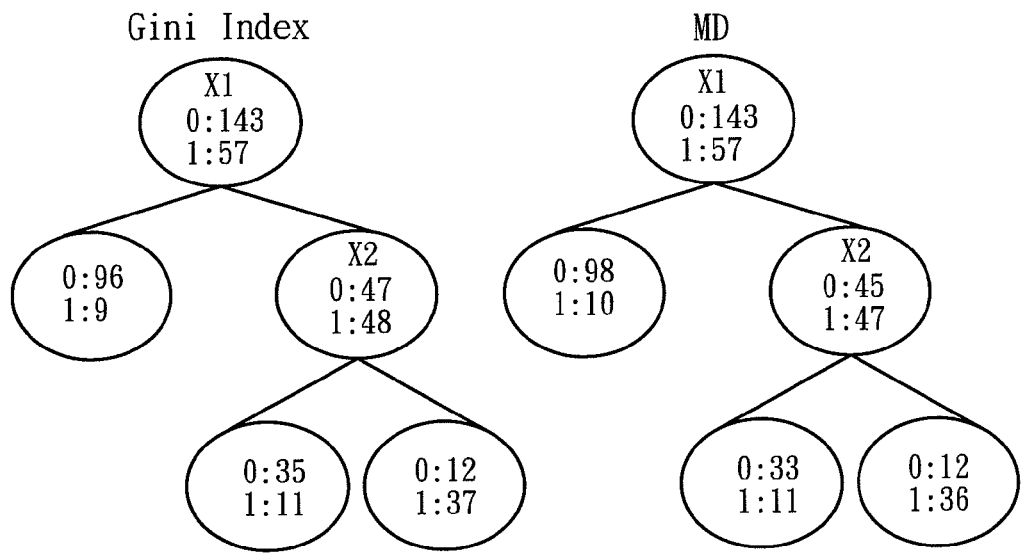
Figure 9D:
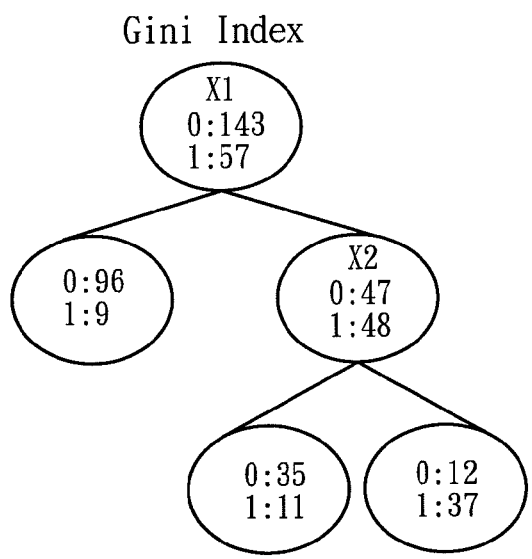

The result obtained by the multi-layer discriminant analysis method is shown in FIG. 9c, and the result obtained by the CART method is shown in FIG. 9d. The preset model can be taken as the tree structure with single variable, and therefore the result using gini index as the cut-point and that using CART are the same.

According to the table 3 of the present example, the result of multi-layer discriminant analysis method using gini index and the result of CART are similar.

TABLE 3

| | Multi-layer FLD cutpoint: Gini index | Multi-layer FLD cutpoint: MD | CART | FLD |
|---|---|---|---|---|
| Accuracy | 0.84 | 0.835 | 0.84 | 0.785 |

Example 4

Figure 10A:
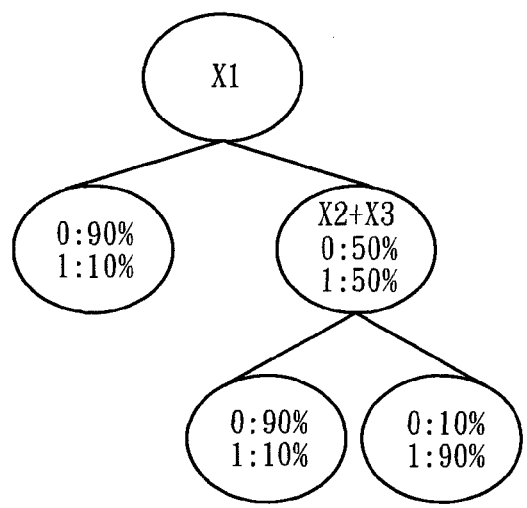
FIGS. 10a to 10c are schemes of the embodiment 4 of the present invention.

In the present example 4, a sample having two classes, five attributes $(X_1, X2, \ldots, X_5)$, and a sample size of 1000 is used, wherein each attribute satisfies $N(0,1)$. A preset model is shown in FIG. 10a, in which at the first layer the sample is classified by $X_1$. Because only the sub-class (0) can be discriminanted at the first layer by $X_1$, the other sample that cannot be classified at the first layer with $X_1$ is taken to the next second layer for further classification with $X_2$ and $X_3$.

Figure 10B:
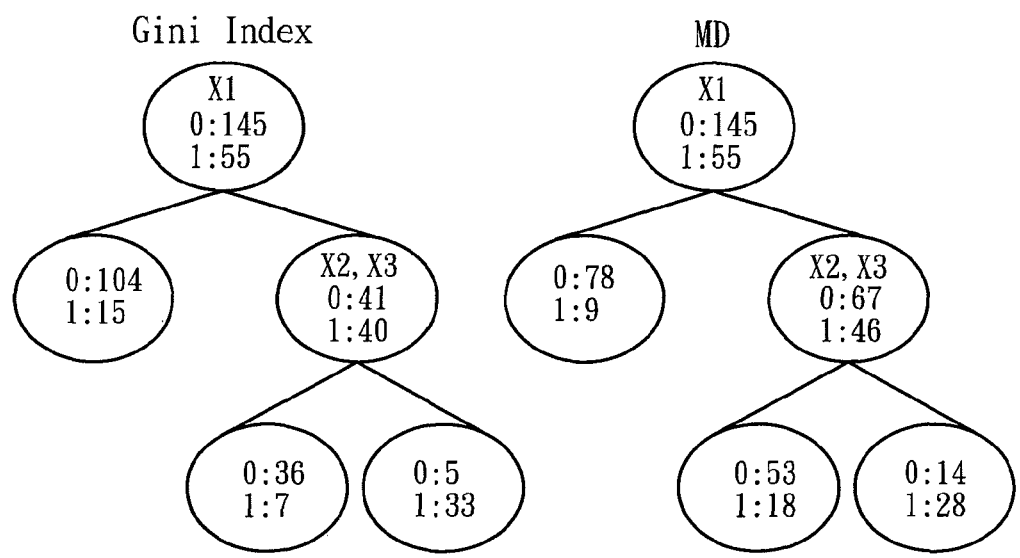
Figure 10C:
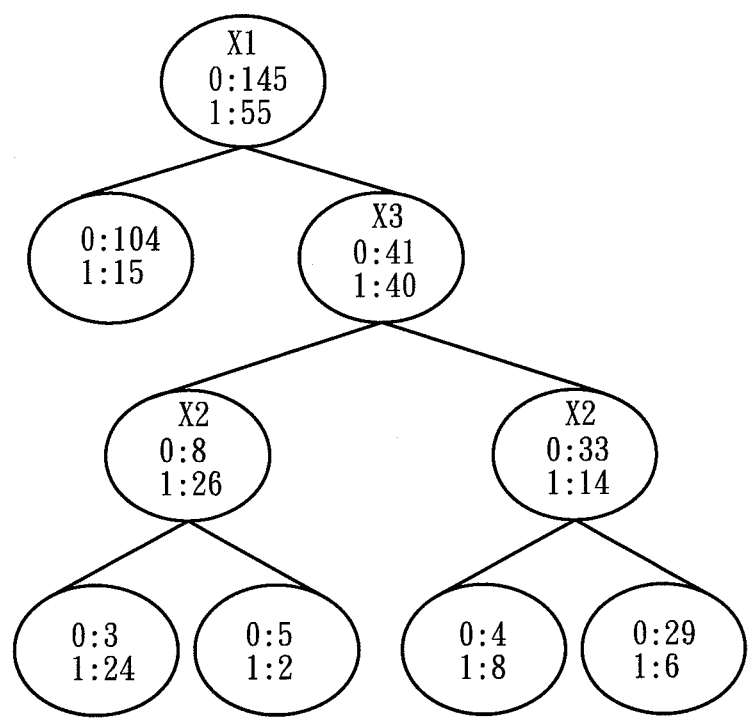

The result obtained by the multi-layer discriminant analysis method is shown in FIG. 10b, and the result obtained by the CART method is shown in FIG. 10c.

According to the table 4 of the present example 4, the result of multi-layer discriminant analysis method using gini index is better than the others.

TABLE 4

| | Multi-layer FLD cutpoint: Gini index | Multi-layer FLD cutpoint: MD | CART | FLD |
|---|---|---|---|---|
| Accuracy | 0.865 | 0.795 | 0.85 | 0.79 |

Example 5

In the present example, an ultrasonic scanning analysis is applied to obtain some quantified attributes of the tumor image and subsequently a discriminant model is constructed by those attributes. Herein, 160 of tumor image samples are used, in which 108 benign tumors of them are represented as class (0) and the others 52 malignant tumors are represented as class (1).

Figure 11A:
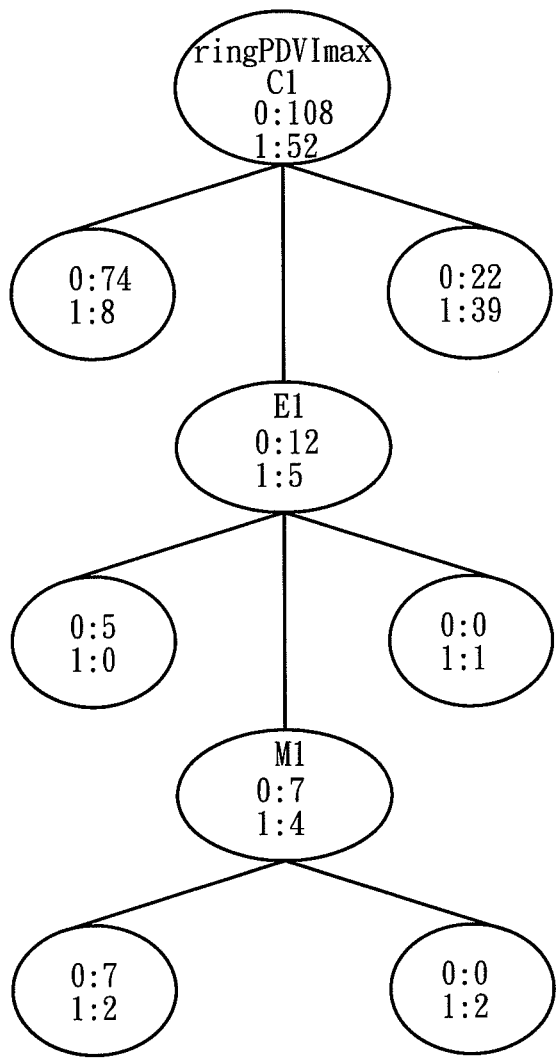
FIGS. 11a to 11d are schemes of the embodiment 5 of the present invention.

The five attributes including CI, EI, MI, HI, ringPDVImax are first taken into analysis. The accuracy is 0.793 when the Fisher discriminant analysis is used when combining the above five attributes, but the accuracy is 0.8 when the multi-layer discriminant analysis is applied. As shown in FIG. 11a, only four variables required to be used in the multi-layer discriminant analysis and the accuracy obtained is higher than that from the Fisher discriminant analysis.

Figure 11B:
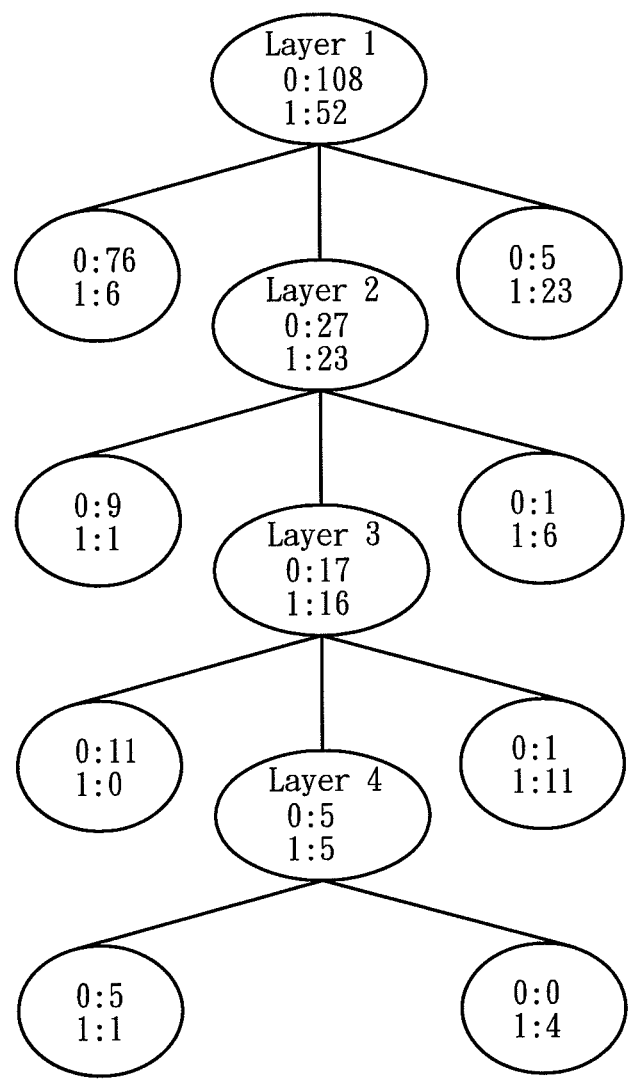
Figure 11C:
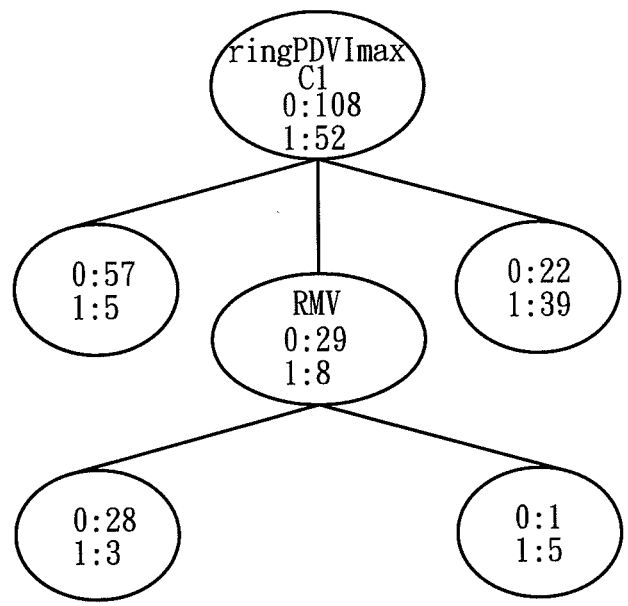
Figure 11D:
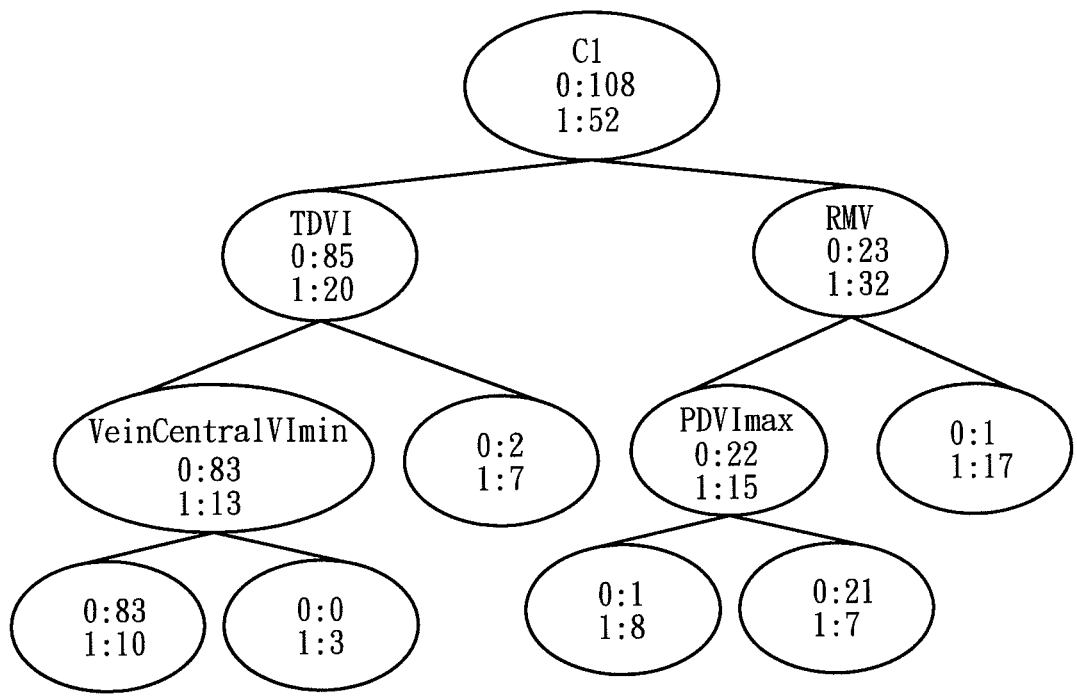

Except the above five attributes, other attributes may also be applied in the present example for the analysis. The result of multi-layer discriminant analysis with gini index for determine of the cut-point is shown in FIG. 11b, and the accuracy is 0.906. The result of multi-layer discriminant analysis with Youden's index for determine of the cut-point is shown in FIG. 11c, and the accuracy is 0.8012. The result of CART is shown in FIG. 11d, and the accuracy is 0.868. Nine attributes comprising ringPDVImax, VeinCentralVImin, VeinTDCentralVImax, TDVImax, CI, RMV, CI2, MCI3, MI2 are used in the FLD, wherein the resulted accuracy is 0.843. Among the above results, the accuracy of multi-layer discriminant analysis is the highest, which can be seen in the table 5 below.

TABLE 5

| | Multi-layer FLD cutpoint: Gini index | Multi-layer FLD cutpoint: Youden's index | CART | FLD |
|---|---|---|---|---|
| Accuracy | 0.906 | 0.801 | 0.868 | 0.838 |

According to the present invention, the multi-layer discriminant analysis method can be executed by computer programs that can be stored in a micro processing unit, a media allowed for recognition or reading, or a stuff or device comprising the said media. The stuff is not specially limited, and may be a hard disc, soft disc, optical disk, ZIP, MO, IC chip, RAM (random-access memory), or any stuff that is able to store a computer program. Since the multi-layer discriminant analysis method of the present invention has been detailed described above, the writing methods of the computer program for the multi-layer discriminant analysis method of the present invention can be realized by anyone with the related skill and therefore is not detailed described here.

Although the present invention has been explained in relation to its preferred embodiment, it is to be understood that many other possible modifications and variations can be made without departing from the scope of the invention as hereinafter claimed.

What is claimed is:

1. A method for multi-layer classifier, applying on a computer readable medium for classifying multiple image samples including a processor, an input device, and a storage device, the method at least comprising the following steps:
   (a) receiving a plurality of samples;
   (b) providing a plurality of attributes, and evaluating a significance of the samples to the attributes by a selection criterion;
   (c) selecting at least one cut-point to establish a discriminant analysis model, which is established by providing a criterion to determine the at least one cut-point in one of the samples which is significant according to the step (b), and classifying the samples into at least one class in a current layer, wherein the at least one class comprises a first class (Node$_A$), a second class (Node$_B$), and an undefined third class (Node$_N$);
   (d) proceeding a step of evaluating a performance of the discriminant analysis model when adding the attributes into the discriminant analysis model, wherein the discriminant analysis model further classifies the undefined class (Node$_N$) and the sample thereof into a next layer when the performance of the discriminant analysis model is improved by adding the attributes, and the next layer of the discriminant analysis model is established by providing the criterion to determine the at least one cut-point of the samples which is significant according to the added attributes, and then classifying the samples into the first class (Node$_A$), second class (Node$_B$), and undefined third class (Node$_N$); and
   (e) providing a stop criterion, in which the discriminant analysis model stops classifying into the next layer when there is no significant attributes can be found at next layer; or in which the discriminant analysis model stops classifying into the next layer when proceeding the step of evaluating the performance of the discriminant analysis model cannot be improved by adding the attributes to the discriminant analysis model under a condition of a rejected null hypothesis.

2. The method as claimed in claim 1, wherein the number of the samples of the undefined third class (Node$_N$) is zero in the last layer of the discriminant analysis model when adding the stop criterion.

3. The method as claimed in claim 1, wherein the selection criterion is Wilk's lambda or Gini index.

4. The method as claimed in claim 1, the step of evaluating the performance is based on a p-value calculated from a F-statistic, or is determined by a impurity criterion;
   wherein the F-statistic represents as the following equation:

$$F = \frac{n-p-1}{p}\left(\frac{1-\Lambda}{\Lambda}\right) \sim F_{p,n-p-1},$$

wherein n is the sample size, p is the number of attributes, and $\Lambda$ is Wilk's lambda; and the impurity criterion represents as the following equation:

$$\text{Impurity} = \frac{N_L \times Gini(t_L) + N_M \times Gini(t_M) + N_R \times Gini(t_R)}{(N_L + N_M + N_R)},$$

wherein $N_L$ is the sample size of Node$_A$, $N_M$ is the sample size of Node$_N$, $N_R$ is the sample size of Node$_B$, $t_L$ is the gini value in Node$_A$, $t_M$ is the gini value in Node$_N$, and $t_R$ is the gini value in Node$_B$.

5. The method as claimed in claim 1, wherein the criterion to determine the at least one cut-point is Gini index, Mahalanobis distance, or Youden's Index.

6. The method as claimed in claim 1, wherein the step of evaluating the performance further comprises: adding the attributes into the same layer of the discriminant analysis model established by the step (c), so that improves the differential power of the same layer of the discriminant analysis model.

7. The method as claimed in claim 1, wherein the step of evaluating the performance further comprises: adding the attributes into the undefined third class (Node$_N$) and creating a layer for establishing a model, the model continuously classifies into the first class (Node$_A$), second class (Node$_B$), and undefined third class (Node$_N$) by providing the criterion to determine the at least one cut-point of the residual samples.

8. The method as claimed in claim 1, wherein the step of evaluating the performance further comprises: defining the first class (Node$_A$) as an undefined class, and then adding the attributes into the combination of the first class (Node$_A$) and undefined third class (Node$_N$) and creating a layer for establishing a model, the model continuously classifies into the first class (Node$_A$), second class (Node$_B$), and undefined third class (Node$_N$) by providing the criterion to determine the at least one cut-point of the residual samples.

9. The method as claimed in claim 1, wherein the step of evaluating the performance further comprises: defining the second class (Node$_B$) as an undefined class, and then adding the attributes into the combination of the second class (Node$_B$) and undefined third class (Node$_N$) and creating a layer for establishing a model, the model continuously classifies into the first class (Node$_A$), second class (Node$_B$), and undefined third class (Node$_N$) by providing the criterion to determine the at least one cut-point of the residual samples.

10. The method as claimed in claim 1, wherein the regression analysis comprises a partial F-test of a forward selection method.

11. A non-transitory computer readable medium storing a program to classify multiple image samples, by performing the steps of:
   (a) receiving a plurality of samples;
   (b) providing a plurality of attributes, and evaluating a significance of the samples to the attributes by a selection criterion;
   (c) selecting at least one cut-point to establish a discriminant analysis model, which is established by providing a criterion to determine the at least one cut-point in one of the samples which is significant according to the step (b), and classifying the samples into at least one class in a current layer, wherein the at least one class comprises a first class Node$_A$), a second class Node$_B$), and an undefined third class (Node$_N$);
   (d) proceeding a step of evaluating a performance of the discriminant analysis model when adding the attributes into the discriminant analysis model, wherein the discriminant analysis model further classifies the undefined class (Node$_N$) and the sample thereof into a next layer when the performance of the discriminant analysis model is improved by adding the attributes, and the next layer of the discriminant analysis model is established by providing the criterion to determine the at least one cut-point of the samples which is significant according to the added attributes, and then classifying the samples into the first class (Node$_A$), second class (Node$_B$), and undefined third class (Node$_N$); and (e) providing a stop criterion, in which the discriminant analysis model stops classifying into the next layer when there is no significant attributes can be found at next layer; or in which the discriminant analysis model stops classifying into the next layer when proceeding the step of evaluating the performance of the discriminant analysis model cannot be improved by adding the attributes to the discriminant analysis model under a condition of a rejected null hypothesis.

12. The computer readable medium as claimed in claim 11, wherein the number of the samples of the undefined third class (Node$_N$) is zero in the last layer of the discriminant analysis model when adding the stop criterion.

13. The computer readable medium as claimed in claim 11, wherein the selection criterion is Wilk's lambda or Gini index.

14. The computer readable medium as claimed in claim 11, the step of evaluating the performance is based on a p-value calculated from a F-statistic, or is determined by a impurity criterion;

wherein the F-statistic represents as the following equation:

$$F = \frac{n-p-1}{p}\left(\frac{1-\Lambda}{\Lambda}\right) \sim F_{p,n-p-1},$$

wherein n is the sample size, p is the number of attributes, and $\Lambda$ is Wilk's lambda; and the impurity criterion represents as the following equation:

$$\text{Impurity} = \frac{N_L \times Gini(t_L) + N_M \times Gini(t_M) + N_R \times Gini(t_R)}{(N_L + N_M + N_R)},$$

wherein $N_L$ is the sample size of Node$_A$, $N_M$ is the sample size of Node$_N$, $N_R$ is the sample size of Node$_B$, $t_L$ is the gini value in Node$_A$, $t_M$ is the gini value in Node$_N$, and $t_R$ is the gini value in Node$_B$.

15. The computer readable medium as claimed in claim 11, wherein the criterion to determine the at least one cut-point is Gini index, Mahalanobis distance, or Youden's Index.

16. The computer readable medium as claimed in claim 11, wherein the step of evaluating the performance further comprises: adding the attributes into the same layer of the discriminant analysis model established by the step (c), so that improves the differential power of the same layer of the discriminant analysis model.

17. The computer readable medium as claimed in claim 11, wherein the step of evaluating the performance further comprises: adding the attributes into the undefined third class (Node$_N$) and creating a layer for establishing a model, the model continuously classifies into the first class (Node$_A$), second class (Node$_B$), and undefined third class (Node$_N$) by providing the criterion to determine the at least one cut-point of the residual samples.

18. The computer readable medium as claimed in claim 11, wherein the step of evaluating the performance further comprises: defining the first class (Node$_A$) as an undefined class, and then adding the attributes into the combination of the first class (Node$_A$) and undefined third class (Node$_N$) and creating a layer for establishing a model, the model continuously classifies into the first class (Node$_A$), second class (Node$_B$), and undefined third class (NodeN) by providing the criterion to determine the at least one cut-point of the residual samples.

19. The computer readable medium as claimed in claim 11, wherein the step of evaluating the performance further comprises: defining the second class (Node$_B$) as an undefined class, and then adding the attributes into the combination of the second class (Node$_B$) and undefined third class (Node$_N$) and creating a layer for establishing a model, the model continuously classifies into the first class (Node$_A$), second class (Node$_B$), and undefined third class (Node$_N$) by providing the criterion to determine the at least one cut-point of the residual samples.

20. The computer readable medium as claimed in claim 11, wherein the regression analysis comprises a partial F-test of a forward selection method.

* * * * *